United States Patent [19]

Bandara et al.

[11] Patent Number: 4,724,392
[45] Date of Patent: Feb. 9, 1988

[54] SYSTEM FOR TESTING MAGNETIC HEAD/DISK INTERFACES

[75] Inventors: Upali Bandara, Stuttgart; Gerhard Elsner, Sindelfingen; Volker Heinrich, Wiesbaden-Nordenstadt; Holger Hinkel, Böblingen; Artur Lang, Worms; Erwin Prinz, Aidlingen; Werner Steiner, Böblingen; Werner Zapka, Gaertringen-Rohrau, all of Fed. Rep. of Germany

[73] Assignee: International Business Machines Corporation, Armonk, N.Y.

[21] Appl. No.: 856,306

[22] Filed: Apr. 28, 1986

[30] Foreign Application Priority Data

May 10, 1985 [EP] European Pat. Off. ........ 85105722.4

[51] Int. Cl.⁴ ............................................. G01N 27/60
[52] U.S. Cl. ..................................... 324/454; 360/102
[58] Field of Search ............... 324/454, 452, 457, 113; 360/103, 102; 340/677

[56] References Cited

U.S. PATENT DOCUMENTS

| | | | |
|---|---|---|---|
| 3,601,694 | 8/1971 | Checketts et al. | 324/454 |
| 3,855,625 | 12/1974 | Garnier et al. | 360/103 |
| 4,479,090 | 10/1984 | Frater et al. | 324/454 |

Primary Examiner—Reinhard J. Eisenzopf
Assistant Examiner—Jack B. Harvey
Attorney, Agent, or Firm—Robert W. Lahtinen

[57] ABSTRACT

Method for measuring the properties of a slider/disk interface in a magnetic disk storage apparatus by measuring a triboelectric current flowing between disk and slider. Rotational speed is adjusted between 100 and 500 rpm so as to obtain a frictional contact between disk and slider. The shape of the tribo current curve obtained during the measuring time interval is analyzed. An early maximum of the tribo current amplitude and a subsequent continual decay indicates a good slider/disk interface and a long lifetime.

10 Claims, 4 Drawing Figures

SYSTEM FOR TESTING MAGNETIC HEAD/DISK INTERFACES

BACKGROUND OF THE INVENTION

The present invention generally relates to magnetic disk storage technology and, more paricularly, to the evaluation, measuring and testing of the properties of head/disk interfaces.

The characteristics of the head/disk interface play an important part for the lifetime of the storage system. Until now, forecasts on the lifetime of the system had been possible only on the basis of lengthy tests which regularly ended in the destruction of the parts tested. To give an example: start/stop tests have been repeatedly carried out until the breakdown of the system, which on an average took 200 hours.

Of considerable importance is the nature and quality of the surfaces which slide on each other, i.e. of the disk on the one hand and the rail of the slider carrying the head on the other. Up to now there did not exist any measuring methods for the substantially precise and useful determination of the quality of these surfaces. The quality of the interface has been proved to be determined by the quantity and quality of a lube used. However, until now the connections between slider flight characteristics and lube could not be measured adequately.

For a general introduction to disk storage technology reference may be had to the booklet "Disk Storage Technology" of International Business machines, 1980. In this booklet, two-rail sliders are described, for instance, on pp. 8 and 13. Such sliders with thin film heads are also described in U.S. Pat. No. 4,218,715 and in IBM TDB, December 1983, pp. 3364 and 3365.

Further, a magnetic head suspension mount apparatus is described in U.S. Pat. No. 4,167,765.

SUMMARY OF THE INVENTION

It is therefore an object of the invention to provide a method of measuring and testing the interface between slider and disk in a magnetic disk storage apparatus, which is precise and normally non-destructive.

According to a further object of the invention this method allows a good characterization of the interaction between slider and disk surfaces.

It is another object of the invention to provide a method allowing a generally non-destructive prediction of the head/disk assembly lifetime.

To achieve the above described objects the invention measures and analyzes the friction induced triboelectric current flowing between disk and slider when they are in rubbing contact.

BRIEF DESCRIPTION

As already stated, the invention basically endeavors to measure a triboelectric current flowing between disk and slider, and to analyze this triboelectric current with respect to its amplitude and time dependence. Only very little is known about the use of triboelectric currents for measuring and testing purposes. One example has been described in British Pat. No. 1,430,390, which relates to the production of electric cables and their inspection as to breaks. The subsequently described method, however, is nowhere explained or suggested in the prior art.

Figure 1:
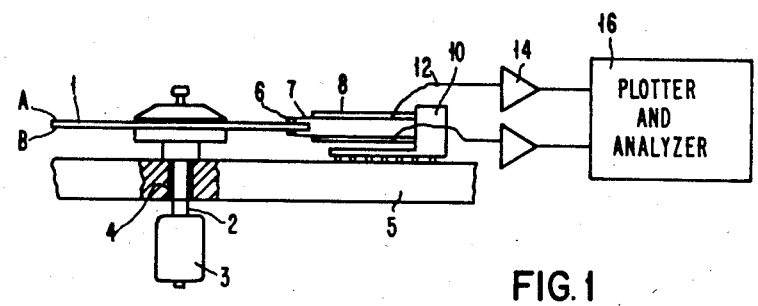
FIG. 1 Shows a magnetic disk storage testing and measuring set-up.

FIG. 1 shows a set-up for measuring the triboelectric current (hearafter shortly called tribo current). A magnetic disk 1 with two coated sides A and B is mounted on a spindle 2, driven by a motor 3. A spindle bearing 4 is contained in a housing 5. With respect to side A, a slider 6 mounted on a suspension 7 flies on the disk. Suspension 7 is mounted on an arm 8 which is fixed electrically isolated to a carriage 10 movable on housing 5. An electrical connection 12 feeds the measured tribo current from arm 8 into an operational amplifier 14. A similar equipment is provided for side B of disk 1. A plotter and analyzer apparatus 16 allows to plot and analyze tribo current curves.

Figure 2:
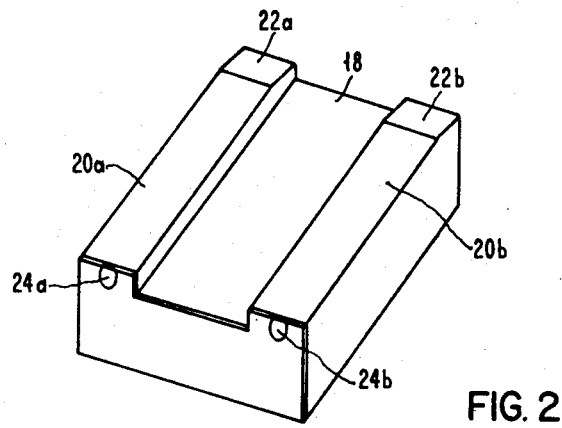
FIG. 2 shows a slider.

FIG. 2 shows details of a slider construction in accordance with the booklet cited above, p. 13, and U.S. Pat. No. 4,218,715. The slider 18 has two rails 20a and 20b sliding by means of an air bearing over the disk surface, at an operational speed of approximately 3600 rpm. As is customary, the rails each start, at their leading portion with respect to a moving track of the disk, with a tapered section 22a and 22b, respectively. Two thin film transducer heads 24a and 24b are mounted on the trailing edge of the slider.

Slider 6 in FIG. 1 with suspension 7 mounted on arm 8 is moved together with carriage 10 to position the slider over the desired disk track.

In accordance with a preferred embodiment of the present invention slider 6 is made of a ceramic mixture comprising aluminum oxide ($Al_2O_3$) and titan carbide (TiC). The inclusion of titan carbide renders slider 6 sufficiently conductive to allow conduction of the tribo current.

A magnetic disk which is particularly well suited for the purpose of the present invention consists of an aluminum magnesium alloy substrate coated with iron oxide ($Fe_2O_3$) and aluminum oxide ($Al_2O_3$) particles dispersed in an epoxy resin.

Figure 3:
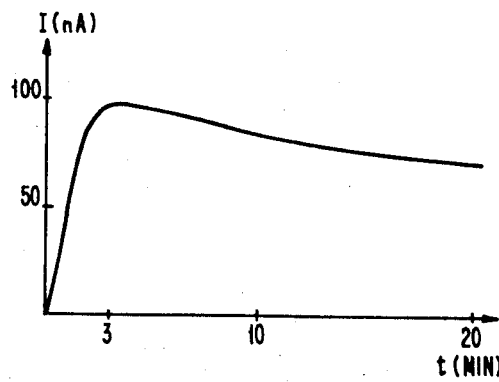
FIG. 3 shows the amplitude of the measured triboelectric current over the measuring time interval, for a very good slider.

To obtain an indication of the lifetime of the disk/slider assembly to be expected, slider 6 is first run-in (conditioned) on a first track and then positioned on another track. In the presence of good sliding properties the tribo current I measured during the testing time interval is as shown in FIG. 3. An early maximum is obtained normally within the first 15 minutes after the start of the test and then the amplitude of the tribo current decreases slowly. The estimated lifetime can be defined, for instance, by the time when the tribo current has decayed to 10% of its maximum. A measuring time period of 8 hours may become necessary which is, however, much shorter than the 200 hours necessary for the tests made up till now.

The height of the maximum of the tribo current depends on the rotational speed and on the quantity and quality of the lube distributed over the disk. To obtain a tribo current, there must be a frictional, i.e. rubbing contact between disk and slider. For this purpose a rotational speed of 100–500 rpm is chosen which results in a flying height of 0–100 nanometers.

According to the invention a lube is used which contains fluor yielding good tribo current amplitudes.

As the described method for measuring the lifetime is not based on the destruction of the assembly it is not necessary to wait for this destruction. Also, it has by this method become economically possible to test all interfaces and not only selected (mostly bad) ones.

In another mode of operation measuring the tribo current allows to obtain an indication on the quality of the surfaces of the disk and the slider rails. It has already been stated that the curve shown in FIG. 3 is obtained for a good slider which may be called "superslider". The tribo current is very much dependent on changes in the disk/slider interface, on the disk surface, on the slider surface and on the lube quantity, quality and distribution. Therefore it has become possible to detect a superslider structure by the shape of the tribo current curve show in FIG. 3, which essentially shows an early maximum and a subsequent slow decay.

Figure 4:
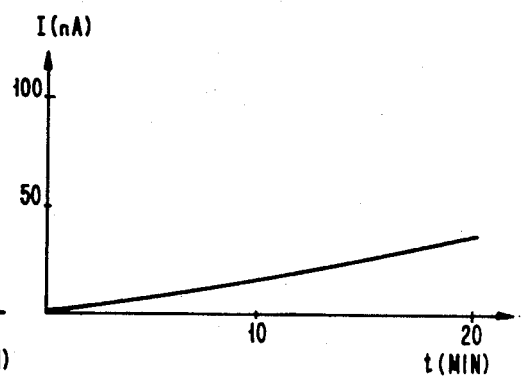
FIG. 4 shows the amplitude of the measured triboelectric current during the measuring time period, for a normal slider.

In contrast thereto, for a normal slider a curve as shown in FIG. 4 is obtained which shows a continuous increase of the tribo current. This increase is due to increased friction which, of course, can lead to a destruction of the assembly. It has been found, that a superslider structure can be obtained by the above described conditioning of the slider on a special track or by mechanical or chemical treatment of the slider rails as e.g. described in European Patent Application No. EP-A-90055. It is evident, that the measuring and testing method of the present invention permits to obtain significant advantages in the production of magnetic head sliders.

In a still different mode of operation the tribo current measuring method according to the invention serves to detect unsymmetries between both sides of a disk. Measurements have shown that A/B side asymmetries of disks have a pronounced influence on the tribo current; for disks whose A sides have been tested in buff direction the tribo current signal was approximately twice as high as in the test of the B sides going against buff direction. Furthermore, the time curve of the tribo current was different in both cases.

However, if both disk sides were tested in their processing direction there was no such asymmetry. With the method as disclosed by the invention it is therefore possible to detect steps during the manufacturing process of the magnetic disks which cause the so-called asymmetries, and to convert these steps from going against buff direction to going in buff direction. It should be taken into consideration that during the conventional operation of the magnetic disk storage the magnetic head on the A side of the disk sees a disk surface rotating to the left, but on the B side of the disk a disk surface rotating to the right.

It has already been indicated that the tribo current is very sensitive to changes of the present operating conditions. This applies also to very small deflections of the slider with respect to the magnetic track. These deflections can be caused e.g. by slackness of the spindle bearing 4 in housing 5. The method as disclosed by the invention therefore also permits the detection of such insufficiencies in the spindle bearing.

We claim:

1. Method for measuring and testing the properties of the interface of a slider carrying a magnetic transducer head and a disk in a magnetic disk storage apparatus comprising the steps of:

adjusting the rotational speed of the disk such that there is a rubbing contact between the slider and the disk, generating a triboelectric current between disk and slider in accordance with said step of adjusting the rotational speed measuring said triboelectric current amplitude during a measuring/testing time period, plotting a graph of the amplitude of said triboelectric current over said measuring/testing time period thereby indicating the properties of the interface.

2. Method according to claim 1 further comprising the step of analyzing said graph to identify when an early maximum value or a continuous increase of the triboelectric current curve is detected.

3. Method according to claim 2 wherein during the step of analyzing said graph an early maximum indicates a good slider, and a continuous increase indicates a normal slider.

4. Method according to claim 2 wherein an indication of the expected lifetime of the slider and cooperating disk is obtained by a decrease of the curve of said graph to a defined percentage (e.g. 10%) of the maximum.

5. Method according to claim 1 wherein the step of adjusting the rotational speed comprises setting the speed to 100–105 rpm.

6. Method according to claim 1 wherein the disk is lubed with a fluor containing material.

7. Method according to claim 1 wherein measurements on both sides of a disk are performed and compared to detect disk side-asymmetries.

8. Method according to claim 1 further comprising the step of analyzing the plot of said graph to determine the occurrence of jumps in the triboelectric current curve which provide an indication of the slackness of the spindle bearing.

9. Method according to claim 1 wherein the slider contains a ceramics mixture of aluminum oxide ($Al_2O_3$) and titan carbide (TiC).

10. Method according to claim 1, wherein the magnetic disk comprises a particular coating with iron oxide ($Fe_2O_3$) particles in a synthetic substance solution.

* * * * *